United States Patent [19]

Marwick

[11] 4,216,058
[45] Aug. 5, 1980

[54] ENHANCED FISSION BREEDER REACTOR

[76] Inventor: Edward F. Marwick, 5149 W. Morse Ave., Skokie, Ill. 60076

[21] Appl. No.: 953,166

[22] Filed: Oct. 20, 1978

Related U.S. Application Data

[63] Continuation-in-part of Ser. No. 810,894, Jun. 28, 1977, Pat. No. 4,121,971, which is a continuation-in-part of Ser. No. 544,178, Jan. 27, 1975, abandoned.

[51] Int. Cl.$^2$ .............................................. G21C 1/00
[52] U.S. Cl. ......................................... 176/39; 176/9; 176/DIG. 1
[58] Field of Search ............... 176/1, 3, 9, 39, DIG. 1

[56] References Cited

U.S. PATENT DOCUMENTS

| | | | |
|---|---|---|---|
| 4,121,969 | 10/1978 | Marwick | 176/39 |
| 4,121,971 | 10/1978 | Marwick | 176/39 |

FOREIGN PATENT DOCUMENTS 1126037  3/1962  Fed. Rep. of Germany .... 176/DIG. 1

OTHER PUBLICATIONS

Exploding Reactors for Power by Edward F. Marwick (1/27/73), Julia Marwick Books, 320 Happ Rd., Northfield, Ill., 60093 pp. 1-40.

Primary Examiner—Samuel W. Engle
Assistant Examiner—S. A. Cangialosi
Attorney, Agent, or Firm—Joel D. Talcott

[57] ABSTRACT

A large inertial confinement breeder reactor wherein neutron bursts produced by fusion, fission or combined fission and fusion are contained seriatim in a large chamber. Each burst results from interception of a large, sub-critical free-falling mass by a smaller upward accelerated slug such that the combined assembly is more than prompt-critical. The resulting thermal energy is absorbed by a spray which generally fills the chamber. The innermost portion of the spray comprises a dense slurry of actinides in molten sodium while the outer portions of spray comprise a very dilute slurry of actinides in molten sodium. The collected heated spray also contains the debris of the explosion and travels through a heat exchanger-precipitator means wherefrom dense slurry, lean slurry, precipitate, and thermal energy may be extracted.

20 Claims, 4 Drawing Figures

ENHANCED FISSION BREEDER REACTOR

This is a continuation-in-part of my U.S. patent application Ser. No. 810,894 filed June 28, 1977, now U.S. Pat. No. 4,121,971, which is in turn a continuation-in-part of U.S. patent application Ser. No. 544,178 filed Jan. 27, 1975 by Edward F. Marwick and Nis H. Juhl, now abandoned.

This invention relates to reactors and, more particularly, to a large all-fission inertial confinement breeder reactor. Bursts or explosions which produce pulses of neutrons and thermal energy are caused when a large, free-falling sub-critical mass is intercepted by an upward traveling high velocity sub-critical slug and the resulting assembly is more than prompt-critical.

Copious quantities of slurry-spray substantially surround the burst and attenuate and absorb most of the shock-blast, neutrons, electro-magnetic radiation and thermal energy of any nuclear explosion. This spray is produced in two portions. An inner portion comprises a thick slurry containing materials to be neutron-irradiated in a working liquid and an outer portion which comprises a leaner slurry of the same materials. The phrase "nuclear explosion" refers to an explosion which results from fission of actinides, fusion without any fissioning of actinides, or some combination thereof. Such nuclear explosion might also include the fissioning of lithium-6 or of beryllium.

The energy and neutron pulse thus produced is contained within a pressure vessel, the walls of which are protected by molten sodium spray containing materials to be neutron irradiated. Such spray becomes a heated working fluid from which useful thermal energy can be extracted.

In the above-identified application, Ser. No. 544,178, two equal size slugs are propelled by helium gas guns and intercept near the center of an ellipsoidal pressure vessel producing an explosion. At the instant of explosion, a generally spherical mass is formed of about 130 kilograms containing about 17% plutonium with over 80% depleted uranium and surrounded by solid sodium. Within the vessel, about a hundred tons of liquid sodium spray containing actinides in about the same proportions is present in the form of a slurry.

The present invention provides several improvements of that reactor system:

(1) Energy production per burst is larger and a sufficient burst frequency can significantly reduce the cost per unit of energy and per unit of useful isotopes produced. The larger reactor system causes less neutron and photon irradiation of the containing chamber's walls.

(2) The quantity of plutonium used is less per unit of energy and isotopes produced, i.e. a lower percentage of the total actinides therein and of the actinides in the slurry is plutonium. Thus, there will be a correspondingly lower fraction of plutonium fissionings and of $Pu^{239}$ $(n,\gamma)Pu^{240}$ reactions in the surrounding slurries. Since there are fewer fast neutrons fissioning within the slurries, and with lower energies of neutrons, the net production of neutrons from neutron irradiated plutonium is much lower, there will be a higher breeding ratio.

(3) There will be less total erosion per unit of energy and isotopes produced since there will be a much lower percentage of actinides and fission products within the slurries. Also, within heat exchanger-precipitator means of the reactor, there will be lower velocities and hence less erosion of walls and other exposed surfaces. Accordingly, there will be less wearing away of walls so that the precipitates will contain a lower percentage of materials worn from the walls.

(4) There is only one helium gas accelerating means which is used to accelerate a slug of lesser mass than either of the two mirror slugs in my prior patent application. In accordance with this invention, a much more massive slug is accelerated by gravity downwardly and the smaller slug is accelerated at high velocities upwardly to a central point of concurrence.

(5) Fewer neutrons which escape from the exploding assembly are lost to capture by sodium atoms since the spray nearest to the exploding assembly is denser with actinides and fewer neutrons are moderate down to energies where capture by sodium is probable.

Although most of the spraying systems of this invention are similar to the spray systems as presented in that application and/or the systems presented in my U.S. Patent applications, Ser. Nos. 810,894 and 722,728, there is a significant improvement in that there are two types of spray. The spray which is nearest to the exploding assembly has a much denser actinide content which the spray further from the exploding assembly is much leaner of actinides in the molten sodium. From a single nozzle, the spray first released is lean of actinide sodium, then dense with actinide slurry, and lastly lean with actinide sodium. Thus, by controlling the types of spray the pattern of a large inner sleeve of dense with actinide spray surrounded by a lean of actinide sodium spray is obtained.

This invention will be better understood by a study of the following additional materials:

U.S. Pat. No. 3,921,405 issued on Nov. 25, 1975 to Rosciszewski. My abandoned U.S. patent applications with these Ser. Nos.: 268,863; 284,086; 308,978; 308,979; 308,980; 325,005; 355,015; 355,016; 655,062 and 582,141.

Technical Memorandum by C. A. Kot, "Shock and Blast Loads in Large Pulse, Inertial Confinement Fusion Reactors," ANL/CTR/RM-44.

Technical Memorandum by R. J. Burke, "Outline for a Large-Pulse, Electron Beam Ignited Fusion Reactor," ANL/ENG/CTR/TM-31.

Paper by A. W. Maschke, "Relativistic Heavy Ions for Fusion Applications," IEEE Transactions on Nuclear Science, Vol. Ns-22, No. 3.

The advantages of this invention will be more readily apparent when the following Specification is read in conjunction with the appended drawings, wherein.

In accordance with this invention, energy and neutrons are produced by a super-critical bursting or a nuclear explosion in a containing chamber when the effects of the burst or explosion are attenuated by a spray of liquid droplets. Many of the neutrons are absorbed by atoms within the liquid, which is, in turn, collected so that heat and some of the irradiated materials therein may be extracted therefrom. The cooled liquid is separated into two portions, leaner density liquid from which most of the suspended particulate materials have been withdrawn and a denser liquid in which there is a thicker concentration of these particulate materials. Some of the particulate materials which have been neutron irradiated are withdrawn from the slurry to be used in fabrication of further explosive assemblies.

In the preferred embodiment of this invention the working liquid is molten sodium and the material to be irradiated is mostly depleted uranium. Additional materials suspended in the slurry include actinides, fission products, and materials worn from the walls which are precipitated out of the slurry forming a precipitate which contains actinides of about 15% plutonium which can then be processed and used in the fabrication of a large downward falling mass and a smaller upward accelerated slug.

Upon concurrence of these slugs, an assembly which is more than prompt-critical is produced which creates a burst of neutrons and thermal energy. If the assembly attains a sufficient level of criticality, a nuclear explosion results which is contained in a large chamber. At the instant of the explosion, the assembly is generally surrounded by an inner region of spray which is thick with actinides as a slurry in molten sodium and by an outer region spray which is a lean slurry of actinides in molten sodium. These sprays attenuate most of the shock-blast of the explosion, absorb the energy of the explosion, and absorb most of the neutrons which escape from the assembly.

The containing chamber of this invention's preferred embodiment has a minimum diameter of about 20 meters and is somewhat similar to the containing chambers disclosed in the aforementioned patent applications. However, this invention does not concern itself with the means of constructing said containing chambers, such being readily within the level of skill of the artisan.

Figure 1:
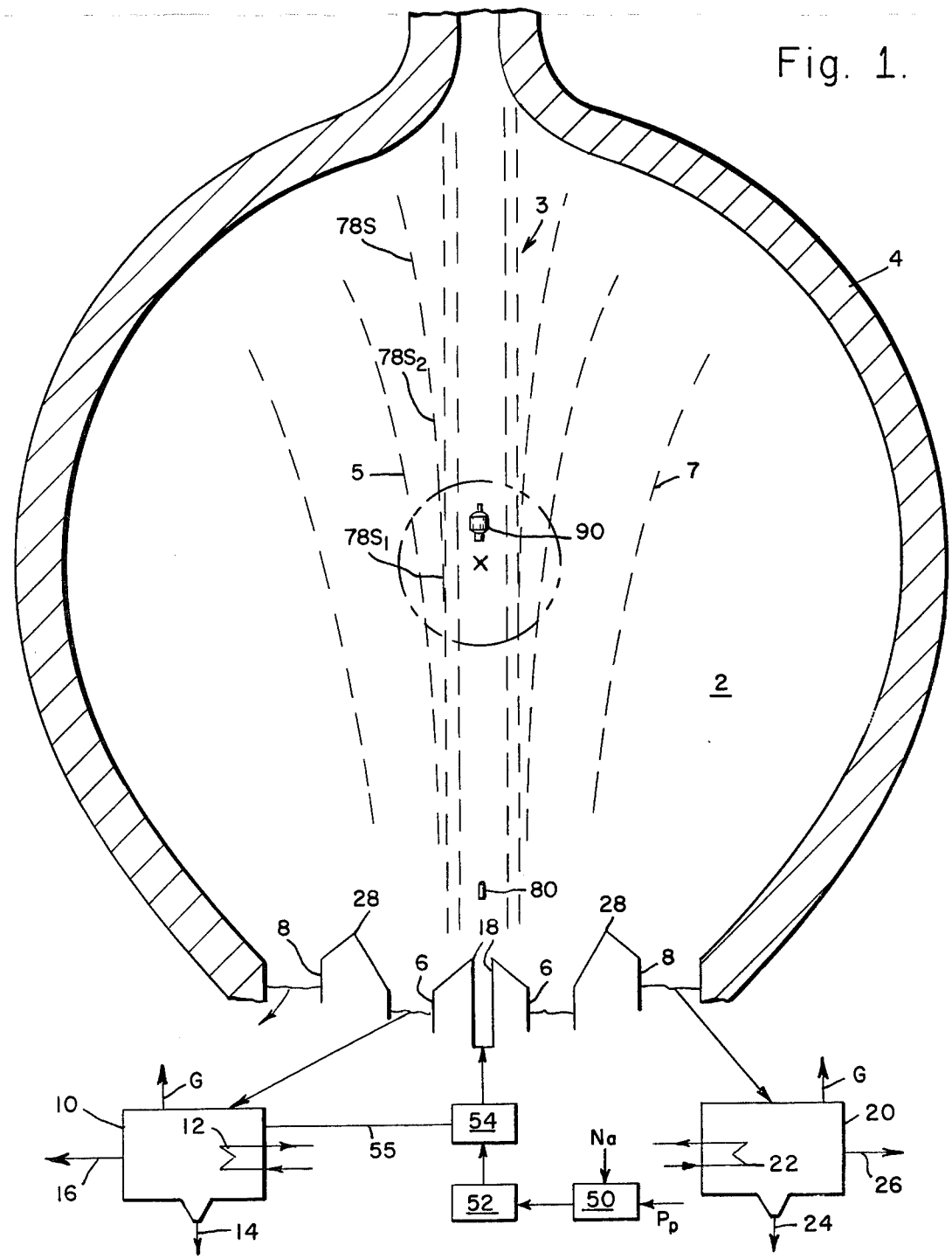
FIG. 1 is a schematic diagram of a reactor system in accordance with this invention with a reactor chamber thereof illustrated in cross-section.

Referring now to FIG. 1, a containing chamber 2 has walls 4 which are a couple of meters in thickness of strong and durable material, such as a steel alloy. Assembly of a large, falling slug 90 and a small, upwardly accelerated slug 80 occurs at a point of concurrence which is about at the center of the chamber 2. At the instant of concurrence, the assembly is substantially surrounded by about 300 tonnes (metric tons) sodium slurry spray. This slurry-spray is of two types, lean slurry wherein the actinides are about 0.04% by atoms and a dense slurry wherein the actinides are about 2% by atoms. The actinides in the dense slurry are slightly more than 18% by weight. the dense slurry is mostly within 1.5 meters of the center of the assembly of the slugs 80 and 90 at the instant of concurrence and the volume of the lean slurry is then about fifty times as great as the volume of the dense slurry.

The spray in this invention will fall in such a manner that most of the spray has a light horizontal velocity towards the center-line. This causes a "bunching up" of spray in the volumes nearer the point X. To prevent spray from being "pushed" into the space through which the falling mass 90 and slug 80 travel, the innermost sprays 3 fall without any horizontal velocity.

After the explosion, the spray falls downwardly into inner basins 6 and outer basins 8. To avoid the collection of precipitate on the walls of the basins, the walls always form an angle with the horizontal greater than 45°. As a result, there are a plurality of basins 6 and 8.

Ridges 28 divide the inner basins 6 from the outer basins 8 and are located about 3 meters from the vertical center-line. Most of the dense slurry and debris from the exploded assembly with much lean slurry falls into the inner basins 6 while the slurry which falls into the outer basins 8 is almost all lean slurry. The slurry collected in the basins 6 go into a plurality of heat exchanger-precipitators 10. Because of the necessity to have much precipitation within the means 10, the slurry flow therein is very slow and the size is much larger than would be the case if it were just a heat-exchanger.

Gases will be extracted from means 10 by suitable gas venting means G. These gases may include helium, xenon, and krypton and can be collected for use or disposal. Liquid carrying pipes or other heat removal means 12 may contain any conventional working fluid. From the precipitator 10, lean slurry is pumped into basins (not shown) for storage to be used in later explosion containments by transport conduit 16. Transport conduit 14 carries cooled, dense slurry to be pumped upwardly to a slurry processing means 30.

The slurries collected in the outer basins 8 go into a plurality of heat exchanger-precipitators 20. These precipitators 20 are similar to the precipitators 10 with heat withdrawal means 22 but with the exception that the rate of flow through the precipitators 20 is faster than through the precipitators 10 because there is less need for precipitation therewithin.

After some precipitation, the great quantity of lean slurry travels via transport conduit 26 to be sprayed for containing explosions, while a slight quantity of dense slurry is transported by conduit 24 to slurry processing means 30. A suitable gas venting means G is also provided.

Figure 2:
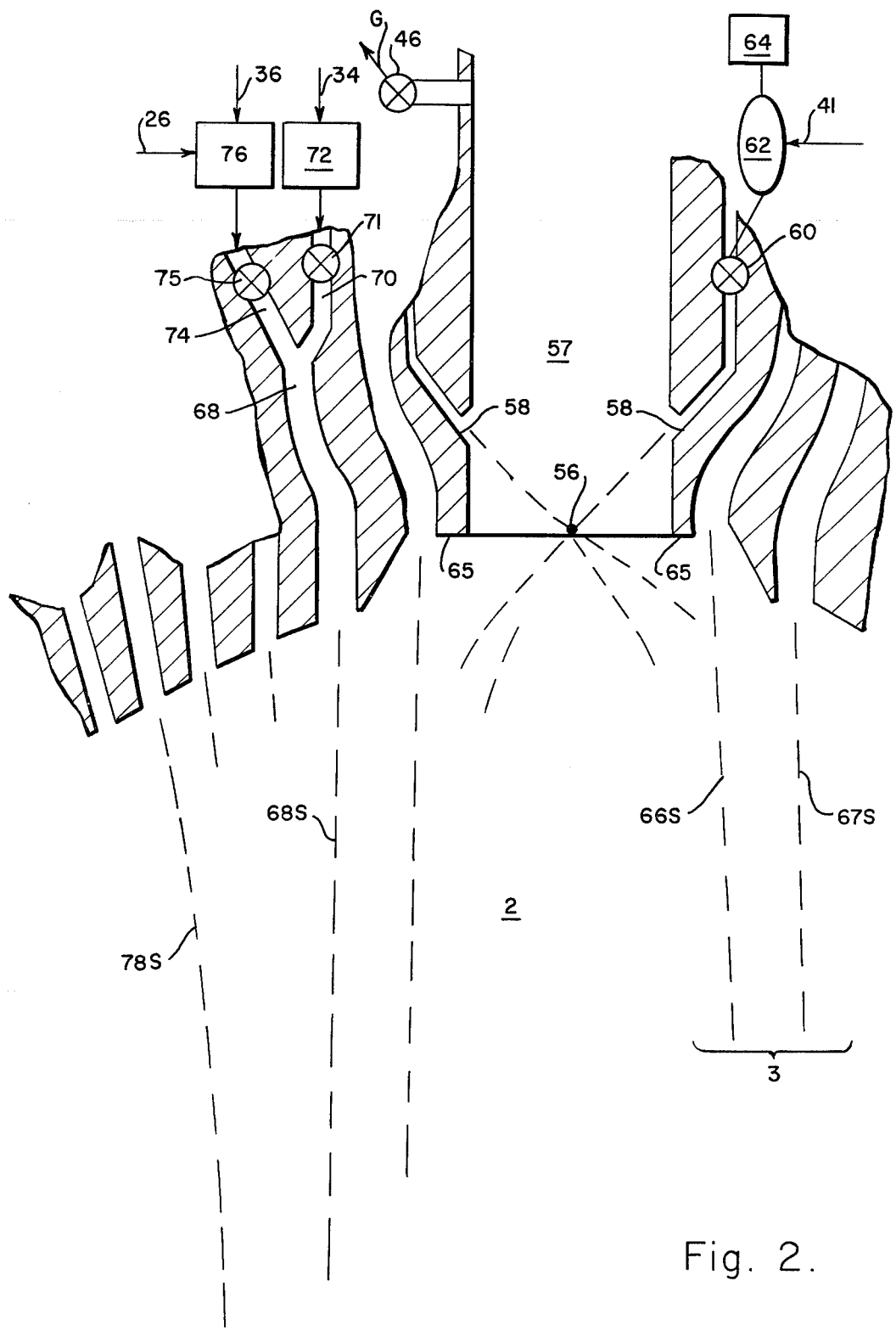
FIG. 2 is a fragmentary cross-sectional view of an upper portion of the chamber of FIG. 1.

In the slurry processing means 30, dense slurry from precipitators 10 and 20 is separated into a very thick slurry-paste which is transported through conduit 38 to a drying means 40, a dense (less thick) slurry which is transported through conduit 34 to storage basins 72 (see FIG. 2), and a very lean slurry which is transported through conduit 36 to storage basins 76 (FIG. 2). Slurry processing means 30 also has a gas venting means G for the withdrawal of gases.

Slurry processing means 30 principally functions as a precipitating basin with heat withdrawal means 23 for extracting heat which is internally generated by radioactive decay. Slurry processing means 30 may comprise a plurality of basins which are batch loaded and batch discharged or may be a single, continuously operated system.

In actinide drying means 40, the cool sodium-actinide paste-slurry is heated up to about 800° C. in vacuo whereat most of the sodium is vaporized off. The sodium vapor is condensed and the somewhat purified sodium can be transported via conduit 39 to slug forming means 42 for use in the fabrication of the accelerated slug and, in molten form, for lubrication of the falling large slug 90. The remaining actinide can be fed to slug forming means 42 via conduits 41 and 43 and used in the fabrication of new slugs.

The upper portion of the chamber 2 is better illustrated in FIG. 2. The large slug falls through a chute 57 which has a diameter of about 80.1 cm. Not shown in the drawing are means for lubricating the inner surfaces of this chute by purified molten sodium so that the large slug fits with sufficient freedom to not have any significant frictional retardation and tightly enough so that it has no net rotational vector when it enters into the chamber 2.

Shown in the upper part of the chute 57 is a valve 46 which controls a passageway from the chute to gas storage and processing means 48 (FIG. 1) Gases such as helium (from slug accelerating means and nuclear reactions) and fission products such as krypton and xenon are being continuously withdrawn from the chamber 2 while the valve 46 is open. It is desired that the total vapor pressure within the chamber 2 at the instant of assembly-explosion is on the order of $10^{-3}$ atmosphere. With such low pressure there is almost no transmission of shock-blast to the chamber walls.

A plurality of gas venting means G transmit such gases to the gas processing means 48 (FIG. 1). Note that many of the isotopes of fission product noble gases are radioactive and decay into non-gases such as cesium and rubidium. These fission product gases represent a significant fraction of the total fission products. Specifically, the approximate percentages are: Kr-83, 0.27%; Kr-84, 0.50%; Kr-85, 0.66%; Kr-86, 0.97%; Kr-87, 1.28%; Kr-88, 1.85%; Kr-89, 2.4%; Kr-90, 2.95%; Kr-91, 2.95%; (Kr-92, Kr-93, Kr-94 and Kr-95 have high percentages but half lives of less than 2 seconds); Xe-131, 1.88%; Xe-132, 2.06%; Xe-133, 3.38%; Xe-134, 3.6%; Xe-136, 3.06%; Xe-137, 3.11%; Xe-138, 3.35%; Xe-139, 3.3%; and Xe-140, 3.15% (Xe-140, Xe-142, Xe-143, Xe-144, and Xe-145 have high percentages but half lives of less than 2 seconds). If 75% of these fission product gases are withdrawn, about a third of the total fission products will have been withdrawn from the system.

At the bottom of the chute 57 there are a plurality of conduit openings 58 disposed downwardly at an angle of 45° with the vertical. Valves 60 control flow of slurry to the openings 58. These valves 60 are opened as the large slug 90 is passing by so that the sprays from openings 58 just miss it. These sprays are traveling as a velocity of about 7 meters per second and have enough time to converge on a point 56 and splatter outwardly and downwardly before the instant of assembly-explosion. This spray may be of purified sodium from drying means 40 (see FIG. 1) and transported by conduit 41 to a basin 62 which is pressurized (if necessary) by a suitable high pressure source 64. If desired, a similar spraying system may be provided at the bottom of the chamber 2 for the protection of lips 18 at an opening in the bottom of chamber 2 for accomodating passage of the small slug 80. The purpose of the sprays from openings 58 is to protect the lower walls of the chute 57 and inner lips 65 adjacent the chute from the effects of the explosion. Additional protective spray systems may be provided as necessary.

A simplified presentation of the spray systems of this invention are shown in FIGS. 1 and 2. The innermost sprays 3, including streams 66s, 67s and 68s, fall straight downwardly. Any inward velocity component would interfere with the travel of the slugs. Additional sprays 5, 7 and 78s fall both downwardly and also have an inward velocity component. Thus there is "bunching" or spray about the point X. Further, each stream may contain two types of spray. For example, spray stream 78s is of two types; portion $78s_1$ is dense slurry and portion $78s_2$ which is of lean slurry. Valves controlling spray 78s are so programmed, as will be shown hereinafter, that portion $78s_1$ is within 1.5 meters of point X and portion $78s_2$ is above and more than 1.5 meters from point X.

A great number of systems are provided to change the slurry 68s passing through conduits such as conduit 68 from dense to lean or from lean to dense to lean. Basin 76 is fed lean slurry by conduits 26 and 36 while basin 72 is fed dense slurry by conduit 34. The lean slurry from basin 76 travels by a conduit 74 into conduit 68. The flow through conduit 74 is controlled by a valve 75 while the flow through conduit 70 is controlled by a valve 71.

The density of and the quantity of the slurry traveling through conduit 68 can be regulated by the control of the valves 71 and 75. With spray 68s, the slurry is at first lean, then dense, and then lean. Because the slurry of sprays 7 is always lean, there is no need of a duplication of valves, conduits, and basins.

For the practice of this invention careful control of hundreds of spray systems through thousands of conduits toward the objective of having an innermost bunching of dense spray surrounded by lean spray near the point X at the instant of assembly-explosion. This control can be readily provided by current computer technology. Such sprays should not in any way interfere with the passage of the slugs 80 and 90.

Although the disclosure of the preferred embodiment is of an all-fission explosion or burst, this concept of an inertial confinement reactor system where the innermost portion of the blast-shock attenuating spray is dense with materials to be irradiated and the greater mass of such spray is less dense and at greater distance from the center of the explosion, this concept can be practiced wherein the inertial confinement explosion is of either an all-fusion or a fusion-fission explosion or burst.

An example of such an explosion is a centroidal fusion explosion mostly of the reaction:

$$D+T\rightarrow He^4(3.5\ Mev)+n(14.1\ Mev) \qquad (1)$$

Such a fusion explosion can be ignited by a most powerful energy pulse or pulses of photons, electrons, and/or ions and then ignite substantially surrounding innermost deuterium and tritium into further reactions (1). These secondary reactions in turn ignite substantially surrounding deuterium by the reactions:

$$D+D\rightarrow T(1.01\ Mev)+p(3.02\ Mev) \qquad (2)$$

$$D+D\rightarrow He^3(0.82\ Mev)+n(2.45\ Mev) \qquad (3)$$

Much of the resulting tritium from reaction (2) will fuse by reaction (1) while a lower fraction of $He^3$ from reaction (3) will fuse by the reaction:

$$He^3+D\rightarrow He^4(3.67\ Mev)+0\ p(14.67\ Mev) \qquad (4)$$

There can be many extra neutrons formed by (n, 2n) reactions on such surrounding nuclides as D, $Be^9$, $Bi^{209}$, $Pb^{208}$, $Li^7$, etc. Although most of the neutrons thereabout could be absorbed by fertile actinides to form fissile actinides such as $Pu^{239}$ and/or $U^{233}$, some neutrons might cause the reaction:

$$n+Li^6\rightarrow T\ (2.74\ Mev)+Hu^4\ (2.06\ Mev) \qquad (5)$$

Also, there would be some reactions:

$$n+He^3\rightarrow T\ (0.19\ Mev)+p\ (0.57\ Mev) \qquad (6)$$

for which the thermal neutrons cross-section is 5,330 barns. Note that in such a reactor system the dense slurry could be depleted uranium and/or thorium in molten sodium.

If there is a desire to produce more tritium, the innermost slurries could be rich in solidified lithium particles in molten sodium while the farther out spray is mostly molten sodium with little lithium therein as either slurry or solution. Paradoxically, in such a system the dense with lithium slurry will have a lower specific gravity than pure molten sodium. The advantage of such a lithium-sodium system over an all lithium system lies in the fact that sodium is, with most possible wall materials, less corrosive than lithium and that lithium is much more expensive than sodium. Hence, with a sodium-lithium system, the cost of alkali metals therefore will be about a tenth or so the cost of an all lithium system. Also, lithium has a freezing point of 180° C. while sodium freezes at 98° C.

Note that with a fusion-fission system using actinides and lithium to be irradiated, cooled sodium slurry will have actinides precipitating and solid and/or liquid lithium as a dross thereon.

Figure 3:
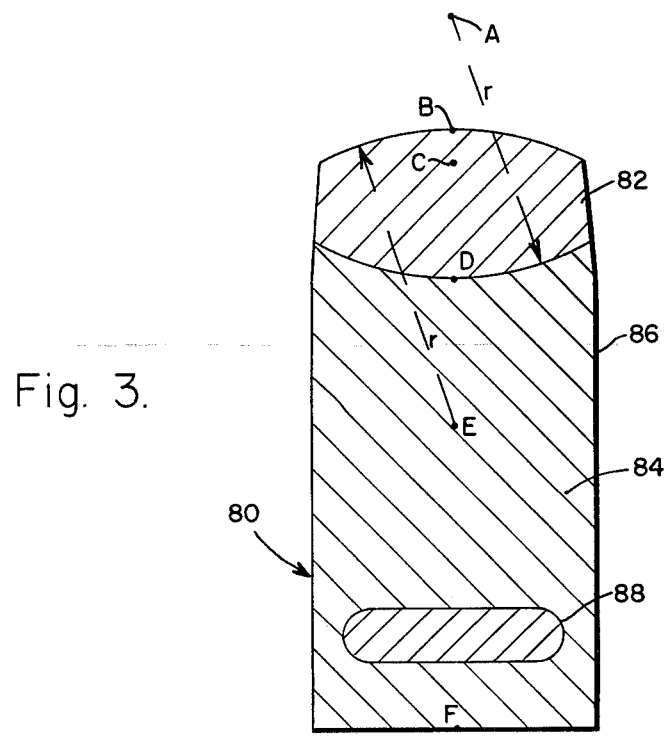
FIG. 3 is a cross-sectional view of a slug for use in the reactor of FIG. 1.

FIG. 3 shows a cross-section of the upward accelerated slug 80, which is basically a cylinder with some modifications in the top portions. The center-line is A-B-C-D-E-F and the diameter through points F, E and D is 19.6 cm. From the center of the bottom at point F, the cylinder is unmodified until point D. Point D is 30 cm from point F. Point E is 20 cm from point F while point C is 37.86 cm from point F. From point D to point C the slug tapers so that the diameter through the point C is 18 cm. The front surface is formed by radial distance r of 20 cm from point E. Point A is 10 cm from the front point B and 50 cm from point F. A front portion 82 has its bottom dimension delineated by a radial distance r of 20 cm from point A. The balance of the slug is a portion 84 which is mostly of purified solid sodium from conduit 41, with the possible exception of a cylindrical section with a radius of 8 cm between 4 and 8 cm of the bottom which is shown as portion 88 and is made of frozen dense slurry.

If the practitioner of this invention so desires, he could make the portion 88 out of lean density frozen slurry but he should be sure that the outer mm or so of the surface 86 (the sides of the cylindrical portion) is made of purified solid sodium.

The front portion 82 is made of pressed dried precipitate from drying means 40 which has a content of about 15% plutonium and 85% uranium. As the reactor is operated, the percentages of fission products will build up within the precipitate and there will also be isotopes of neptunium, americium and curium therein. Adjustments, as will be disclosed later, will compensate for the effects of these changes.

Figure 4:
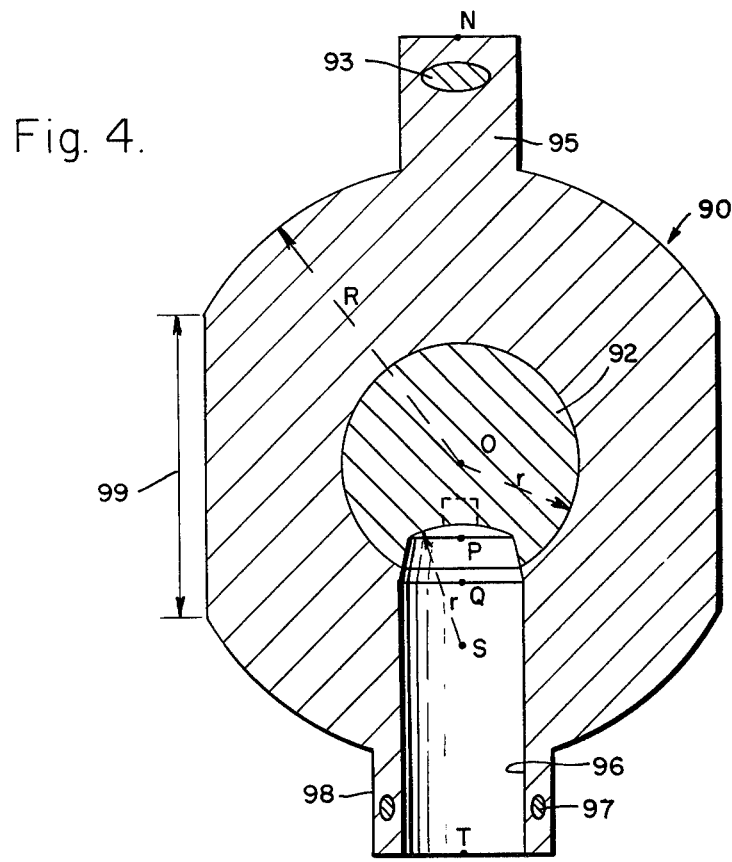
FIG. 4 is a cross-sectional view of an additional slug for use in the reactor of FIG. 1.

FIG. 4 illustrates the large slug 90 which falls downwardly for concurrence in an assembly-explosion with the slug 80. Slug 90 is a modified cylinder with a center O and a center line N-O-P-Q-S-T. The diameter through the point O is 80 cm and the height 99 of the cylindrical portion with a center O is 60 cm. With the exemption of a cavity 96, there are solid portions both above and below the cylindrical portion which is limited by the radial R of 50 cm. On top of that spherical portion is placed a cylindrical portion 95 with a radius of 10 cm and the top circular surface centered at point N which is 70 cm above point O.

Surrounding cavity 96 in the bottom spherical portion is a hollow cylinder 98 with an outside radius of 15 cm and having at the center of its hollow circular bottom point T which is 65 cm from point O. The bottom of the cavity and to the point Q which is 20 cm from point O, the cavity 96 is cylindrical with a radius of 10 cm and a height of 45 cm. Above point Q, the cavity tapers so that at point P which is 12.14 cm from point O, the radius is 9 cm.

The upper surface of the cavity is limited by the radial r of 20 cm which is centered at point S which is 30 cm on the center-line down from point O.

A center portion 92 is centered at point O and is spherical, with the exception of part of cavity 96, and has a radius r of 20 cm. Portion 92 is of the same composition as is front portion 82 of the slug 80.

The balance of the mass 90, with the exception of parts 93 and 97, is of solidified lean slurry. (That includes portions 94, 95, and 98.) Part 93 is a cylindrical shape between 4 and 8 cm from the top centered at point N and with a radius of 7 cm, and is composed of solidified dense slurry. Part 97 is a ring of solidified dense slurry that is centered along the center-line between 4 and 7 cm from the bottom and with an inside radius of 11 cm and an outside radius of 13 cm.

A critical design feature of the explosive of this invention is that the concurring assembly should become prompt-critical when point B of the slug 80 is about at point P of the slug 90. If the assembly is to be critical too soon, the limiting radius r centered on point A could be reduced a few mm and the upper portion of portion 84 can be slightly enlarged. Note that the volume of the slug 80 remains unchanged but that its mass is slightly reduced.

If the criticality is too low for the assembly, there could be some plutonium-rich alloy added to the portion 94 as shown by the part 91. Specifically, when the mass and slug have been constructed and it is determined that the criticality is too low, a substantially cylindrical hole with a radius of about 3 cm and a depth of about 5 cm is drilled along the center-line. In this hole is placed a filling shape having a general composition of 30% plutonium-70% uranium.

An alternative method of adjusting criticality would be to make the portion 82 of the slug 80 of a higher percentage plutonium alloy.

It should be noted that the percentage of plutonium needed for the actinide material herein to be of criticality with the dimensions herein given, depends upon the isotopic composition of the plutonium, i.e. the higher the fraction of fissile isotopes, the lower the total percentage of plutonium needed. The practitioner of this invention should select the percentage of plutonium that gives the criticality desired with the actinides and other atoms therein that he is using.

When the percentage of fission products reaches 5% or 10%, the precipitate could be purified by means known to those skilled in the art. With each explosion, there is about 1.2 grams of fission products and a net increase of fissile isotopes of about 0.5 grams. With a starting inventory of 34 tons of depleted uranium and 6 tons of plutonium and an explosion every 20 seconds, there would be slightly more than 1.8 tons of fission products produced in a year. Perhaps one ton of this will precipitate with the actinide. The balance may be withdrawn with the gases or dissolved in the sodium. After a year, the fission product faction of the precipitate will be about 2.5%.

Assuming that no changes or additions were made in the inventory after one year the composition of the precipitate would be about 17.2% plutonium, 2.5% fission products and the balance uranium.

The slug 90 does not need to have much structural strength since it is under negligible strains or stresses as it falls from a point 122.5 meters above point X in 5 seconds. On the other hand, slug 80 will be under great accelerating forces as it is fired upwardly from an accelerating means 52 similar to the means as disclosed in the aforementioned U.S. patent application Ser. No. 544,178. For example, if the velocity leaving the accelerating means 52 is 490 m/sec and its length is 122.5 m, the time of acceleration is a half second and the magnitude of acceleration is 980 meters/second$^2$ or one hundred "G." Thus, the fabricated slug 80 should have high strength. Towards that end, the temperature of slug just prior to acceleration should be at least 40° C. below the melting point of sodium, and the actinide portion 82 should be without any major faults.

The helium gas gun accelerating means 52 will have flexibility in its accelerating ability so that the speed of concurrence can be such that an assembly-explosion of the desired magnitude occurs.

A shutter-drainage means 54 protects the accelerating means 52 from the effects of the explosion and somewhat prevents accelerating helium from entering the chamber 2. Also, some of the spray and debris from the explosion is collected therein and transported by conduit 55 to precipitator 10. With some 20 seconds between assembly-explosions, there is plenty of time for such clean-up and for moving large slug 90 into dropping position in dropping means 44 and for its release and fall to point X.

Such dropping means 44 could be like the means disclosed in my U.S. patent application, Ser. Nos. 582,141, 810,894 and 722,728.

Not only could the slug accelerating means be a helium gas driven device, but the practitional might elect to use a slug accelerating means not unlike those planned for use as "mass drivers" as disclosed in the following papers:

Grey, J., PROCEEDINGS OF THE PRINCETON/AIAA/NASA CONFERENCE, May 7-9, 1975-AIAA "Space Manufacturing Facilities," Pages 17-20

O'Neill, G. K., et al, SPACE MANUFACTURING FROM NONTERRESTRIAL MATERIALS- 1976 NASA AMES/OAST Study An abbreviated sequence of the operational procedures of the practice of the preferred embodiment of this invention could be as follows:
(all times are with the instant of explosion as 0.0 seconds)
—15 Start to move mass 90 into dropping means 44. Open valve 46.
—5.1 Bottom hatch of dropping means 44 opened.
—5.0 Large slug 90 released.
—4.0 Bottom hatch of dropping means 44 closed.
—2.0 Valve 75 opened (for simplication only sprays 68s, 9, and 58s will have their operational timings disclosed.) p1 —1.6 Valve 75 closed and valve 71 opened.
—1.4 Valve 71 closed and valve 75 opened.
—0.53 Start acceleration of small slug 80.
—0.4 Open valve 60.
—0.2 Open shutter means 54 and valves for sprays 9.
—0.03 Stop upward acceleration of slug 80.
—0.02 Close shutter means 54, close valves 75, 60, 46 and valves controlling sprays 9.
0.00 Assembly-explosion.

The many parameters of this preferred embodiment can be altered by the practitioner without deviating from the broad fundamentals of this invention. That is the size of the containing chamber, the magnitude of the contained assembly-explosion, the fractional proportions of actinides within the different sprays, the distance of falling mass, the speed of accelerated slug, the mass of mass, the mass of accelerated slug, the frequency of contained assembly-explosions, etc., can be changed without deviating from the basic principles of this invention. Further, the slugs 80 and 90 may be brought together under conditions producing only heat and a high neutron content burst, rather than a nuclear explosion.

It will be readily apparent from the foregoing Specification that other modifications may be made by the artisan to the reactor and methods disclosed without departing from the spirit and scope of this invention.

I claim:

1. A method of producing useful energy and isotopes, in a containing chamber having an impact point, utilizing a large mass of fissile and fertile actinides and a small mass of fissile and fertile actinides, each mass being less than critical, said method comprising the steps of:
    injecting separately at two different predetermined times said large mass and said small mass respectively;
    causing said large mass to move downwardly in said chamber toward said impact point;
    propelling said smaller mass upwardly in said chamber to collide with said large mass such that the combined masses become more than prompt critical and produce a neutron pulse and intense nuclear reactions at said impact point;
    substantially surrounding said center of nuclear reaction with a first region of slurry spray having a relatively dense actinide concentration of material to be irradiated; and
    substantially surrounding said first region with a second region of slurry spray having a relatively lean actinide configuration of material to be irradiated.

2. The method of claim 1 wherein said nuclear reaction include fission reactions.

3. The method of claim 2 wherein said nuclear reactions include fusion reactions.

4. The method of claim 1 wherein said nuclear reactions include fusion reactions.

5. The method of claim 4 including the step of introducing lithium to be irradiated into said first region of slurry spray.

6. The method of claim 1 wherein said first slug has an opening therein and said second slug is configured for insertion in said opening, and wherein said first slug is gravitationally dropped into said chamber and said second slug is upwardly propelled for insertion into said opening with substantial force.

7. The method of claim 1 wherein said step of causing intense nuclear reactions includes producing a nuclear explosion at said center of nuclear reaction and the method includes the additional step of recovering useful energy.

8. Apparatus for producing useful energy and isotopes, said apparatus comprising:
    a containing chamber having a center of nuclear reaction;

less than critical first slug means of fissile and fertile actinides with a cavity therein having a segment of concentrated fissile materials, less than critical second slug means formed of fertile and fissile actinides for an interference fit in said first slug means cavity and having a segment of concentrated fissile materials in an end portion thereof;

means for injecting said first and second slug means, respectively;

means for dropping first slug means into said chamber with the cavity being downwardly directed;

means for upwardly propelling second slug means for insertion in the cavity for bring said segments in close proximity such that the combined masses become more than prompt cirtical and produce intense nuclear reactions at said center of nuclear reaction;

spray means for producing a configuration of actinide containing slurry spray in said chamber substantially surrounding said point of concurrence with a first region of slurry spray having a relatively dense actinide concentration of material to be irradiated in close proximity to said point of concurrence and a second region of slurry spray having a relatively lean actinide concentration of material to be irradiated remote from said point of concurrence.

9. The apparatus of claim 8 wherein said nuclear reactions include fusion reactions.

10. The apparatus of claim 9 wherein said material to be irradiated comprises lithium.

11. The apparatus of claim 8 wherein said nuclear reactions include a nuclear explosion and the apparatus further includes means for recovering useful energy.

12. The apparatus of claim 8 wherein said first slug means has an outer portion comprising solidified lean slurry and a central portion of actinide materials.

13. The apparatus of claim 12 wherein said first slug central portion comprises 15% plutonium and 85% uranium.

14. The apparatus of claim 12 wherein said second slug means has a rear portion comprising solid sodium and a forward portion of actinide materials.

15. The apparatus of claim 14 wherein said second slug forward portion comprises 15% plutonium and 85% uranium.

16. The apparatus of claim 8 wherein said spray means comprises:

first storage means for holding slurry having a relatively dense concentration of material to be irradiated;

second storage means for holding slurry having a relatively lean concentration of material to be irradiated;

conduit means for carrying slurry from said first storage means to be directed into said first region; and conduit means for carrying slurry from said second storage means to be directed into said second region.

17. The apparatus of claim 16 wherein said spray means includes:

conduit means connected to said first storage means and said second storage means;

first valve means in said conduit means for blocking flow of slurry from said first storage means;

second valve means in said conduit means for blocking flow of slurry from said second storage means; and control means for controlling the selective opening and closing of said first and second valve means to provide a stream of slurry spray having a relatively dense actinide concentration adjacent said point of concurrence and a relatively lean actinide configuration removed from said center of nuclear reaction when said assembly of nuclear materials produces said intense nuclear reactions.

18. The apparatus of claim 8 including:

first collecting means for collecting slurry spray having a relatively dense configuration of material to be irradiated; and second collecting means for collecting slurry spray having a relatively lean configuration of material to be irradiated.

19. The apparatus of claim 18 wherein each of said first and second collecting means includes:

heat exchange means for removing thermal energy; and means for gravitationally settling materials within said slurry.

20. The apparatus of claim 8 wherein the relative concentrations of materials to be irradiated in said first and second regions of slurry spray is about 50 to 1.

* * * * *